United States Patent [19]

Otsuka et al.

[11] 3,838,446

[45] Sept. 24, 1974

[54] MULTI LAYER MAGNETIC RECORDING TECHNIQUE

[75] Inventors: Hiroaki Otsuka, Tokyo; Norihisa Manabe, Saitama; Tatsuo Konishi, Tokyo, all of Japan

[73] Assignees: Nippon Hoso Kyokai; Nippon Electric Company, both of Tokyo, Japan

[22] Filed: Nov. 8, 1972

[21] Appl. No.: 304,891

[30] Foreign Application Priority Data

Nov. 12, 1971 Japan ................................ 46-90779

[52] U.S. Cl. ......................... 360/19, 360/57, 360/66

[51] Int. Cl. ........................... G11b 5/02, H04n 5/78

[58] Field of Search ................... 178/6.6 A, 5.4 CD; 179/100.2 MD, 100.2 T; 360/19, 66, 18, 57

[56] References Cited

UNITED STATES PATENTS

| | | | |
|---|---|---|---|
| 2,876,294 | 3/1959 | Wissmann | 179/100.2 D |
| 3,064,087 | 11/1962 | Gabor | 179/100.2 D |
| 3,278,678 | 10/1966 | Rank | 178/6.6 A |
| 3,283,085 | 11/1966 | Lemke | 178/6.6 A |
| 3,542,946 | 11/1970 | Warren | 178/6.6 A |

*Primary Examiner*—Raymond F. Cardillo, Jr.
*Attorney, Agent, or Firm*—Sandoe, Hopgood & Calimafde

[57] ABSTRACT

According to this multi-layer recording technique, a relatively low-frequency signal track is recorded on a magnetic tape in the direction of the tape's motion. A relatively shallow portion of the first recorded track along the surface of the magnetic tape is erased, and a plurality of second relatively high-frequency signal tracks that traverse the first track are recorded. The first track may contain audio information while the second track contains video information.

7 Claims, 5 Drawing Figures

MULTI LAYER MAGNETIC RECORDING TECHNIQUE

BACKGROUND OF THE INVENTION

This invention relates to a magnetic video signal recording system in which a video signal is recorded across other recorded tracks produced by low frequency signals, such as audio signals or control signals, on a magnetic tape.

In a magnetic recording system such as a four-head video tape recorder (VTR), a video signal is recorded on a 2-inch wide magnetic tape by four heads mounted in quadrature relationship on a rotatable disc driven by a head motor at a nominal speed of 240 Hz (14,400 rpm). The magnetic tape for the four-head VTR is normally about 36 microns thick, 26 microns for the polyester base and 10 microns for the magnetic coating. The video signal recorded on the magnetic tape is normally of high frequency. Therefore, the recorded wavelength on the magnetic tape is short. As a result, the video track formed in the magnetic coating is very shallow, leaving the deeper region of the magnetic coating unused. The video track is generally considered to be less than 1 micron in depth.

In order to efficiently utilize the deeper region of the tape, a multi-layer magnetic recording system has been proposed, in which a low frequency signal such as an audio signal having a relatively long recorded wavelength on the magnetic tape is recorded first so as to form a low-frequency-signal track deep within the magnetic coating, and then the video signal is recorded across the low-frequency-signal track. Such a multi-layer magnetic recording system is described in detail in Japanese Pat. No. 446,274 (Japanese Patent Publication No. 26799/1964).

However, the video signal, when recorded in superimposition on the low-frequency-signal track, erases and replaces the latter in the shallow portion of the magnetic coating, because of the saturation recording of the video signal. On reproduction by the four-head VTR, therefore, the magnetic head for scanning the low-frequency-signal track crosses over 960 video tracks per second. This causes an amplitude-modulation of the low-frequency-signal recorded by the magnetic head by a trapezoidol wave of 960 Hz. The degree of the amplitude modulation depends on the low-frequency-signal wavelength on the magnetic tape and the characteristic of the video heads. Normally, the amplitude of the low-frequency-signal reproduced from the portions crossing the video track is three-fourths of that reproduced from other portions thereof. This causes a characteristic aggravation in the reproduced low-frequency signal.

It is therefore an object of this invention to provide a video magnetic recording system using a multi-layer recording technique in which the reproduced low-frequency-signal is not influenced by the video tracks.

SUMMARY OF THE INVENTION

According to this invention, there is provided an improved magnetic recording system in which a low-frequency signal is recorded by a stationary head first to form a low frequency signal track penetrating deeply into the magnetic coating of a magnetic tape, and then a shallow portion of the low-frequency-signal track is erased by a stationary surface errasing head. After that, a video signal is recorded across the low-frequency-signal track to form video tracks.

BRIEF DESCRIPTION OF THE DRAWINGS

The features and advantages of this invention will be clearly understood from the detailed description of a preferred embodiment taken in conjunction with the accompanying drawings, wherein.

DESCRIPTION OF THE PREFERRED EMBODIMENT

Figure 1:
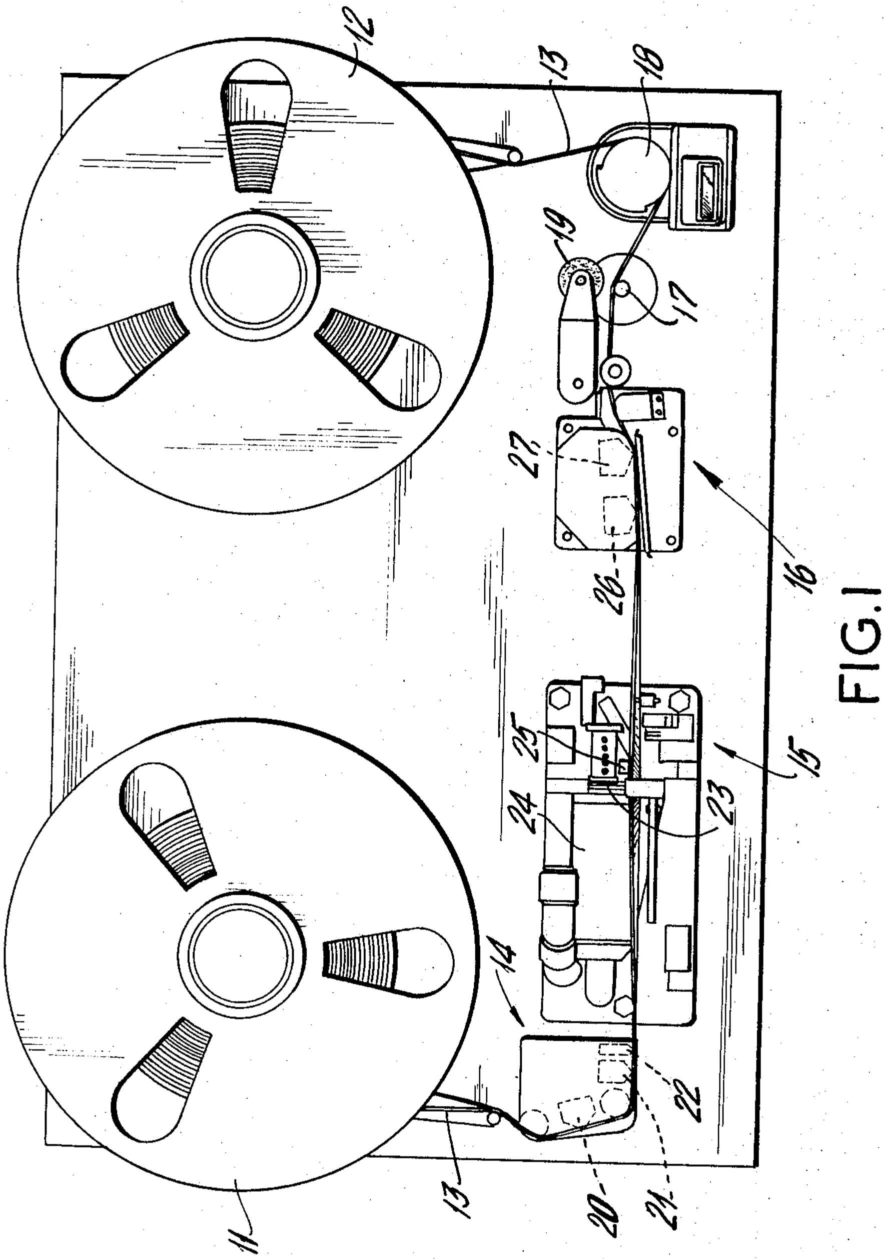
FIG. 1 is a plane view of a preferred embodiment of the apparatus this invention.

Referring to FIG. 1, a four-head video tape recorder (VTR) comprises a supply reel 11, and a take-up reel 12. A magnetic tape 13 from the supply reel 11 is fed through a first head assembly 14, a video head assembly 15, a second head assembly 16, a capstan 17 and a tape timer 18 to the take-up reel 12 by the capstan 17 driven by a capstan motor and a pinch roller 19, at a nominal speed of 15 inches/second.

Any previously present and/or undesirable signal recorded on the magnetic tape 13 fed from the supply reel 11 is errased by an errasing head 20. Two kinds of audio signals, such as two speech signals in different languages, are recorded on the central portion of the magnetic tape 13 by a multi-layer audio head 21 having two gaps formed separately in the vertical direction, whereby two audio tracks 30 and 31 (FIG. 2) are recorded on the magnetic tape. The audio tracks 30 and 31 are allowed to spread to a deep portion of the magnetic coating of the magnetic tape 13, as shown in FIG. 3. Then, the shallow portions of the audio tracks 30 and 31 are erased by a stationary surface erasing head 22 having two gaps formed separately in the vertical direction. The depth of the audio tracks 30 and 31 to be erased by the surface erasing head 21 is given a predetermined value greater than the depth of video tracks 32, which are to be formed subsequently by recording a video signal. In the four-head VTR, generally, the video tracks have a depth of less than 1 micron. Therefore, it is desirable to make the erasure depth of the audio tracks greater than 1 micron.

Then, the video signal is recorded across the audio tracks 30 and 31 by four heads mounted in quadrature relationship on a rotatable disc 23 driven by a direct-coupled head motor 24 at a speed of 240 revolutions per second, whereby video tracks 32 are formed in turn across the audio tracks 30 and 31 at a rate of 960 tracks per second. The video tracks 32 are substantially perpendicular to the direction of the tape transportation (The angle between the video tracks and the direction perpendicular to the tape transportation direction is preferably 33 minutes). After the recording of the video signal is completed a control signal is recorded on the lower portion of the tape 13 by a control head 25, whereby a control track 33 is formed along the lower tape end. Then, the tape 13 is passed through the second head assembly 16 in which undesired signals recorded on the portions along the upper end and the control track 33 on the magnetic tape 13 are erased by an erasing head 26. Another audio signal and a cue signal are recorded by an audio head 27, whereby another audio track 34 and a cue track 35 are formed on those portions, respectively. Then, the magnetic tape 13 is fed to the take-up reel 12 through the tape timer 18 by the capstan 17 and the pinch rollor 19.

Figure 2:
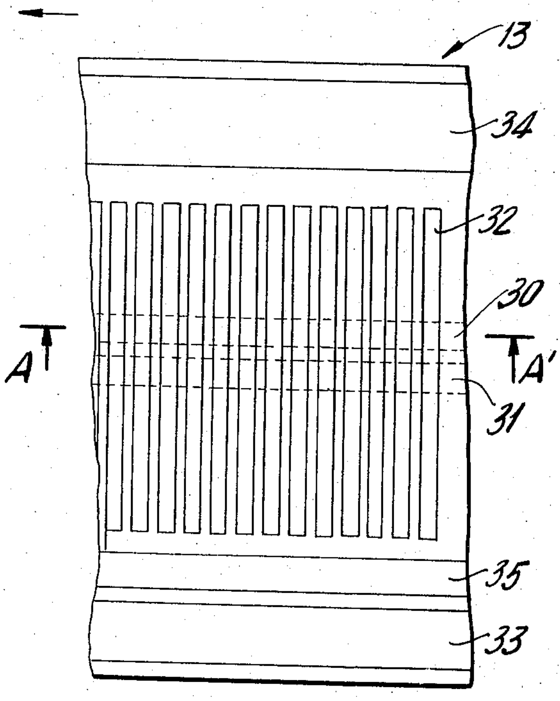
FIG. 2 is a plane view of relationship between the recording tracks formed by the apparatus shown in FIG. 1.
Figure 3:
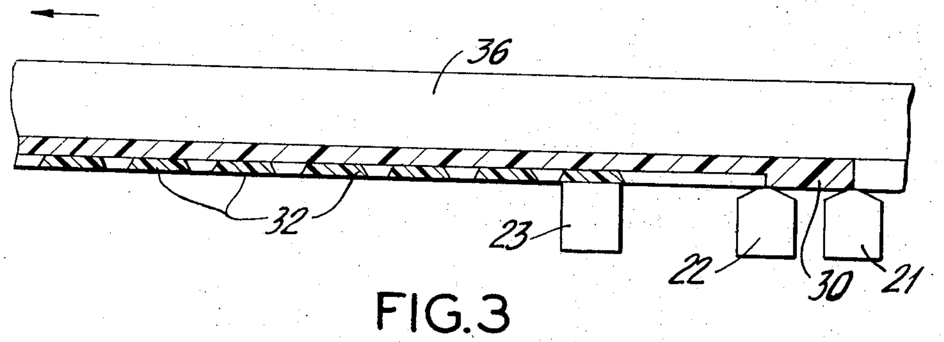
FIG. 3 shows a longtudinal cross-section of the recorded tape pattern shown in FIG. 2.

Thus, the recorded tape pattern or the recorded tracks shown in FIG. 2 is obtained on the magnetic tape 13. The side view taken along the line A—A' of the recorded magnetic tape is shown in FIG. 3. The magnetic tape 13 has a polyester base 36 of about 26 microns in depth and a magnetic coating of about 10 microns in depth. The magnetic coating viewed in cross-section has two layers; one is the audio track layer 30, and the other is the video track layer 32 which is formed on the audio track layer 30. The audio track 30 does not appear between the video tracks 32.

Figure 4:
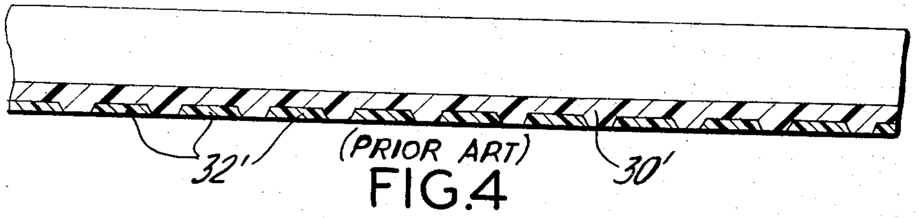
(PRIOR ART) FIG. 4
FIG. 4 shows a longitudinal section of the tape pattern recorded by a previously known multi-layer magnetic recording system.
Figure 5:
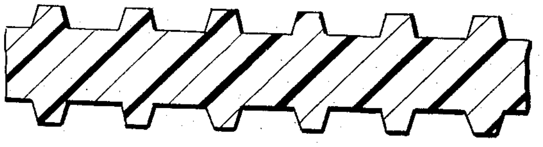
FIG. 5 shows a waveform of the reproduced signal derived from the magnetic tape shown in FIG. 4.

In contrast, as shown in FIG. 4, the audio track 30' formed by a multi-layer audio head according to a previously known technique does exist between the video tracks 32'. On reproduction of the recorded multi-layer audio signals, the multi-layer audio head crosses the video tracks 32' at a rate of 960 tracks per second. As a result, the reproducing multi-layer audio signals are amplitude-modulated by a trapezoidal wave of 960 Hz as shown in FIG. 5. In this case, the amplitude of the reproduced audio signals corresponding to the portions as the video track 32 crossed by the audio track 30 is three-fourths of that corresponding to the non-crossed portions of the audio tracks 30 and 31.

In this invention, the surface erasing head 22 is installed between the multi-layer audio head 21 and the rotatable disc 23 to erase the surface portion of the audio track 30 recorded by the multi-layer audio head 21. Therefore, the audio track 30 does not exist between the video tracks 32, as shown in FIG. 2. So, on reproducing the multi-layer audio signal, the amplitude-modulation by the video tracks 32 does not appear in the reproduced multi-layer audio signals.

The erasure depth of the audio tracks 30 and 31 by the surface erasing head 22 ideally is just as thick as the depth to be erased by the video signal. In practice, however, the depth to be erased by the video signal depends on the particular video signal. Therefore, it is desirable that the erasure depth of the surface erasing head be greater than the depth of the recording track formed by the video signal.

Furthermore, the surface erasing heas is required to have high erasure effect on the surface of the magnetic coating only. For this purpose, a magnetic head equivalent to the video head having a narrow gap is preferable.

What is claimed is:

1. A magnetic recording apparatus comprising:

first recording means for recording at least one relatively low frequency signal on a magnetic tape so as to form at least one first recording track thereon which may extend to a substantial depth of the magnetic coating of said tape;

means for erasing a shallow portion of said first recorded track along the surface on which it was recorded, said erased portion having a constant predetermined depth; and second recording means for scanning the surface on which the erasure was made to record a relatively high frequency signal within the erased portion and in a direction traversing said first recorded track so as to form a second recorded track traversing said first recorded track.

2. The apparatus of claim 1, wherein said relatively high frequency signal is a video signal, and said second recording means comprises four heads mounted in quadrature relationship on a rotatable disc.

3. The apparatus of claim 2, wherein said first recording means comprises a plurality of magnetic recording heads for recording a plurality of speech signals in different languages with a plurality of recorded tracks assigned to each respective speech signal.

4. A method of recording signals on a magnetic tape comprising:

recording at least one relatively low frequency signal on said magnetic tape in the direction in which the tape is transported so as to form at least one first track thereon;

erasing a shallow portion of said first track along the surface on which it was recorded, said erased portion having a constant predetermined depth; and recording a relatively high frequency signal by scanning the surface on which the erasure was made to record said second track within the erased portion and in a direction traversing said first track so as to form a second recorded track thereon.

5. The method of claim 4, wherein said relatively high frequency signal is a video signal and is recorded by rotating four heads in quadrature relationship to each other.

6. The method of claim 5, wherein said low frequency signal is an audio signal.

7. The method of claim 5, wherein more than one low frequency signal is recorded, each signal containing a different language and each speech signal being recorded by a different mangetic head.

* * * * *